United States Patent
Deng et al.

(10) Patent No.: US 9,973,722 B2
(45) Date of Patent: May 15, 2018

(54) SYSTEMS, DEVICES AND METHODS FOR DISPLAYING PICTURES IN A PICTURE

(71) Applicant: QUALCOMM Incorporated, San Diego, CA (US)

(72) Inventors: Fan Deng, San Diego, CA (US); Karthikeyan Shanmugavadivelu, San Diego, CA (US); Wan Shun Vincent Ma, San Diego, CA (US); Narayana Karthik Sadanandam Ravirala, San Diego, CA (US); Lei Ma, San Diego, CA (US); Pengjun Huang, San Diego, CA (US); Shizhong Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 14/185,683

(22) Filed: Feb. 20, 2014

(65) Prior Publication Data
US 2015/0062434 A1    Mar. 5, 2015

Related U.S. Application Data

(60) Provisional application No. 61/870,732, filed on Aug. 27, 2013.

(51) Int. Cl.
*H04N 5/45* (2011.01)
*G09G 5/14* (2006.01)
(Continued)

(52) U.S. Cl.
CPC ............... *H04N 5/45* (2013.01); *G09G 5/14* (2013.01); *H04N 5/445* (2013.01);
(Continued)

(58) Field of Classification Search
CPC .. H04N 21/4316; H04N 5/45; H04N 21/4438; H04N 21/4728; H04N 1/00336;
(Continued)

(56) References Cited

U.S. PATENT DOCUMENTS

| 6,195,497 B1 | 2/2001 | Nagasaka et al. |
| 7,916,976 B1 | 3/2011 | Kedikian |

(Continued)

FOREIGN PATENT DOCUMENTS

| CN | 1921605 A  | 2/2007 |
| EP | 1052849 A1 | 11/2000 |
| EP | 1724695 A1 | 11/2006 |

OTHER PUBLICATIONS

International Search Report and Written Opinion—PCT/US2014/051732—ISA/EPO—dated Nov. 10, 2014.

*Primary Examiner* — Tsion B Owens
*Assistant Examiner* — Alison Slater
(74) *Attorney, Agent, or Firm* — Knobbe, Martens, Olson & Bear, LLP

(57) ABSTRACT

Systems, devices, and methods of displaying and/or recording multiple pictures in a picture (PIP) on the same display of a digital display device are disclosed. The PIPs can show objects from the main field view of the display device, such as a front camera lens, as well as objects from a different field of view, such as a back camera lens. The PIPs can further track the objects that are being displayed.

24 Claims, 8 Drawing Sheets

(51) Int. Cl.
*H04N 5/445* (2011.01)
*H04N 21/431* (2011.01)
*H04N 21/44* (2011.01)
*H04N 21/4402* (2011.01)
*H04N 21/4223* (2011.01)

(52) U.S. Cl.
CPC ..... *H04N 21/4223* (2013.01); *H04N 21/4316* (2013.01); *H04N 21/44008* (2013.01); *H04N 21/440263* (2013.01); *G09G 2352/00* (2013.01)

(58) Field of Classification Search
CPC ....... H04N 21/21805; H04N 21/23418; H04N 21/4312; H04N 5/23219; H04N 5/23293; H04N 5/23216; H04N 5/44591; G06F 3/04842; G06F 2203/04803; G09G 2340/045; G09G 5/14; G06T 2207/30221; A63B 2024/0025; A63B 2243/00; A63B 2244/24; A63B 43/00; A63B 69/0028
See application file for complete search history.

(56) References Cited

U.S. PATENT DOCUMENTS

| | | | |
|---|---|---|---|
| 8,064,685 | B2 | 11/2011 | Solem et al. |
| 8,249,299 | B1 | 8/2012 | Dhawan et al. |
| 8,254,699 | B1 | 8/2012 | Zhao et al. |
| 8,452,107 | B2 | 5/2013 | Zheng et al. |
| 8,483,437 | B2 | 7/2013 | Shamaie |
| 2002/0075407 | A1* | 6/2002 | Cohen-Solal ............ H04N 5/45 348/565 |
| 2003/0208771 | A1* | 11/2003 | Hensgen .............. H04N 21/235 725/100 |
| 2004/0128317 | A1* | 7/2004 | Sull .................. G06F 17/30849 |
| 2006/0017832 | A1* | 1/2006 | Kemppinen ....... H04N 1/00307 348/333.11 |
| 2007/0115349 | A1 | 5/2007 | Currivan et al. |
| 2007/0279482 | A1 | 12/2007 | Oswald et al. |
| 2008/0129825 | A1* | 6/2008 | DeAngelis ......... A63B 24/0021 348/169 |
| 2009/0009424 | A1* | 1/2009 | Kang ................. H04N 21/4728 345/1.3 |
| 2010/0026721 | A1* | 2/2010 | Park ...................... G06F 3/0481 345/660 |
| 2010/0053212 | A1* | 3/2010 | Kang ............... H04N 21/23412 345/629 |
| 2010/0188579 | A1 | 7/2010 | Friedman |
| 2010/0218228 | A1 | 8/2010 | Walter |
| 2010/0239130 | A1 | 9/2010 | Chen et al. |
| 2011/0047384 | A1 | 2/2011 | Jacobs et al. |
| 2011/0249073 | A1 | 10/2011 | Cranfill et al. |
| 2012/0092529 | A1 | 4/2012 | Choi et al. |
| 2013/0148861 | A1* | 6/2013 | Ferlatte .............. G06K 9/00724 382/107 |
| 2013/0155308 | A1* | 6/2013 | Wu .......................... G06T 3/00 348/333.05 |
| 2013/0174035 | A1 | 7/2013 | Grab |
| 2013/0176203 | A1 | 7/2013 | Yun et al. |
| 2013/0258141 | A1 | 10/2013 | Kim et al. |
| 2013/0335575 | A1 | 12/2013 | Tsin et al. |

* cited by examiner

SYSTEMS, DEVICES AND METHODS FOR DISPLAYING PICTURES IN A PICTURE

INCORPORATION BY REFERENCE TO ANY PRIORITY APPLICATIONS

This application claims the benefit of U.S. Provisional Patent Application No. 61/870,732, filed Aug. 27, 2013, entitled RECORDING VIDEO WITH TWO PIP, the disclosure of which is incorporated herein by reference in its entirety.

BACKGROUND

Field of the Invention

This disclosure relates generally to display systems and methods. In particular, features for capturing, displaying and/or recording two or more pictures in a picture (PIPs) system with tracking capability on a display are disclosed.

Description of the Related Art

With the advent of inexpensive and smaller video display systems, the display industry is growing. More and more people enjoy viewing videos using digital viewing systems such as video cameras and mobile devices. The videos can be used in a variety of applications, for instance for entertainment, for professional uses, for fun and pleasure, or for sentimental memories. Given the vast number of uses of viewing videos, more features and capabilities of devices that display the videos are desirable.

Some of the desired features in display devices include displaying a picture in a picture (PIP) on a display of the device. For some uses of digital display systems, the ability to display a PIP allows a viewer to watch video on the main screen as well as other videos in the PIP. For example, one may watch a live football game as it's being played in a main screen while also watching video highlights of another game, or other information, in a smaller picture window.

However, a single PIP does not allow for watching more than one other video at the same time as watching the main video. A viewer, while watching a football game on the main video screen, may want to watch more than one other football game in smaller picture windows. Conventional systems that display only one PIP therefore compromise the enjoyment and utility of the display.

Further, it may be desired to zoom in on specific objects or people in a video and view these in a PIP while those objects or people are moving. For instance, one may want to watch a football game on a main video screen while also viewing a smaller window showing a closer view of a player on the main screen as the player moves around. Conventional systems that display other videos, such as other football games, lack the ability to zoom in on and follow an object, such a particular player, in the PIP.

SUMMARY

Systems, devices and methods for simultaneously displaying and/or recording two or more pictures in a picture (PIP) on a single display of a digital imaging device with tracking capabilities are disclosed.

In one aspect of the present disclosure, embodiments of methods for displaying a plurality of PIPs on an electronic device are disclosed. In some embodiments, the method comprises displaying a video on a screen of the device; selecting a first object in the video; displaying a first PIP on the screen, wherein the first PIP comprises the first object; and displaying a second PIP on the screen, wherein the second PIP comprises a second object.

In another aspect, embodiments of a system for displaying a plurality of PIPs on an electronic device are disclosed. In some embodiments, the system comprises a selection module configured to recognize selection of a first object to track in a first video; and a screen configured to display the first video, a first PIP comprising the first object as it is being tracked, and a second PIP comprising a second object.

In another aspect, embodiments of a system for displaying a plurality of PIPs on an electronic device comprise means for displaying a video on a screen of the device; means for selecting a first object in the video; means for tracking the first object; means for displaying a first PIP on the screen, wherein the first PIP displays the first object as it is being tracked; and means for displaying a second PIP on the screen, wherein the second PIP displays a second object.

Several embodiments of a non-transient computer readable medium configured to store instructions that when executed by a processor perform a method for displaying a plurality of PIPs on an electronic device are disclosed. In some embodiments, the method comprises displaying a video on a screen of the device; selecting a first object to track in the video; displaying a first PIP on the screen, wherein the first PIP displays the first object as it is being tracked; and displaying a second PIP on the screen, wherein the second PIP displays a second object.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

DETAILED DESCRIPTION

Figure 1:
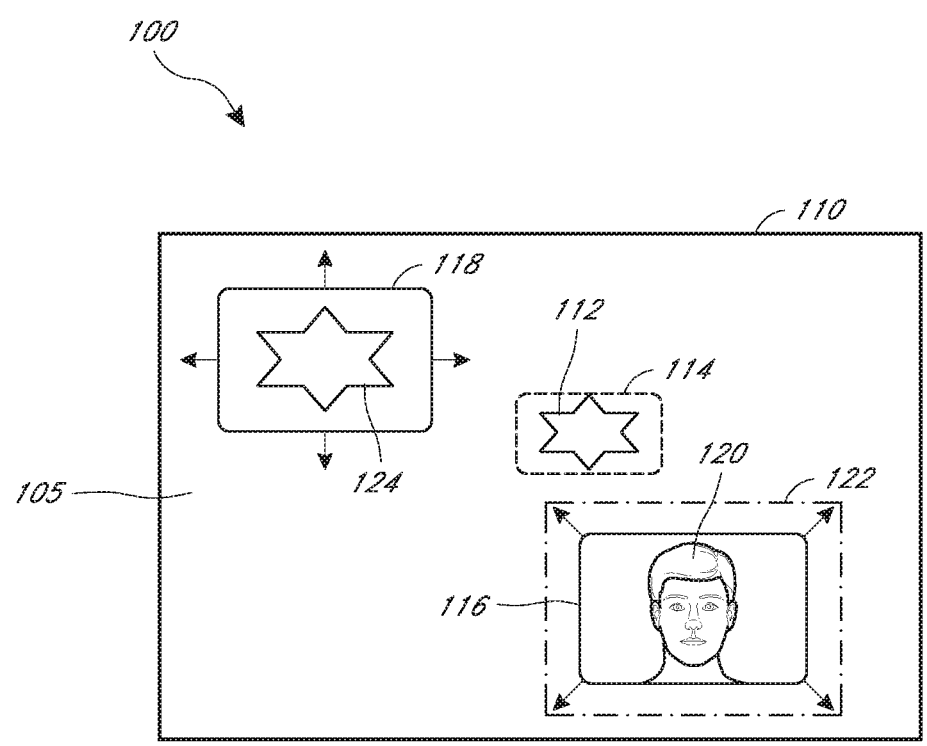
FIG. 1 depicts a front view of an embodiment of a display having two pictures in a picture (PIPs) with one of the PIPs showing a tracked object on the display.

The following detailed description is directed to certain specific embodiments of the development as described with reference to FIGS. 1-9. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Systems, devices and methods for displaying and/or recording two or more pictures in a picture (PIP) on a display of a digital imaging device disclosed. In some cases, the objects shown in the PIP display windows are tracked by the system. For example, a viewer may wish to watch a tennis match on the main part of the display while having the option of tracking more closely either of the two players during play. Having two PIPs wherein each captures one of the players allows the viewer the freedom to watch, on the same display, the entire court where the ball is hit back and forth as well as either player in one of the two PIPs. In some embodiments, a device, such as a mobile phone, may display and/or record the objects in the field of view of an imaging sensor on the device. In some embodiments, more than two PIPs, such as three, four or more PIPs, are displayed containing items from the same field of view.

In one embodiment, one or more of the multiple PIPs may be programmed to track objects in the scene so that the view within that PIP is always of a particular object or person, no matter where they are located in the scene. For example, one may wish to track a tennis player while the player moves around the court during a match. In one embodiment, one of the PIPs would display a tracking view of the player as he moves in the field of view while the digital device also displays a full court view at the same time. In some embodiments, multiple PIPs would display a tracked view of multiple objects from the field of view of the device.

In some embodiments, one of the PIP's may display a view taken from a second imaging sensor on the display device. The objects in the scene captured from the second image sensor may be shown in their own PIP window on the same screen as the objects viewed by the first image sensor. In some embodiments the second image sensor may be viewing an entirely different field of view as the image sensor. For example, the first image sensor may be on the front of a cell phone, and the second image sensor may be on the back of the cell phone. In such a case, multiple PIPs allow for objects from the first field of view to be displayed on the screen along with objects from the second field of view. In some embodiments, the second imaging sensor may be on an entirely different device. For instance, a separate video source may provide the video to display in one or all of the PIPs.

In some embodiments, a recorded video may be processed to display multiple PIPs. For instance, it may be desirable to post-process a recording of a tennis match such that the two players are shown in multiple PIPs. In one embodiment, a device allows for selection of objects shown in the recorded video that a viewer wishes to display in PIPs. In another embodiment, objects from another video source may be chosen to display in one or more PIPs of the recorded video.

In some embodiments, the videos displayed in the PIPs may each be displayed on separate devices or on separate screens. In some embodiments, each PIP is saved on separate video files. In some embodiments, the PIPs recorded on separate video files may be viewed independently, all together, or in subsets.

Turning now to FIG. 1, an embodiment is shown of a device 100 having a display 110 displaying two PIPs 116, 118 over a main video 105. The display 110 may be on or from a device 100 such as a viewing or recording device, including a video camera, mobile phone, tablet, computer, etc. In some embodiments, the display 110 may show video captured or recorded by the device 100. For example, the display 110 may be on a mobile phone that is capturing video. In some embodiments, the display 110 may show video that was taken by a different device (not shown). For instance, the display 110 may be on a mobile phone that did not capture and is not capturing the recording.

A first PIP 118 and a second PIP 116 are shown over the main video 105 on the display 110. The main video 105 may refer to a recording or other video with moving images. The first PIP 118 and the second PIP 116 may be shown over this main video 105. Therefore the main video 105 may be considered to be "behind" or "underneath" the two PIPS 116, 118, which may be considered to be "in front of" or "on top of" the main video 105.

The device 100 is viewing, showing, and/or recording a first object 112 in the main video 105 on the display 110. The first object 112 shown in the main video 105 is also displayed by the first PIP 118 as a first displayed object 124. A second object (not shown) is displayed in the second PIP 116 as a second displayed object 120.

In some embodiments, the first object 112 is in the same field of view as that shown by the display 110. In some embodiments, one or both displayed objects 120, 124 being shown in the PIPs 116, 118 are in the same field of view as each other. In some embodiments, the second object is in a different field of view as shown in the main video 105 of the display 110. In an embodiment, the second object is a user of the device 100, and the user's face is displayed as the second displayed object 120 in the second PIP 116. In some embodiments, as discussed in further detail herein with respect to FIG. 5, the first object 112 is viewed by an imaging sensor (not shown) on the front of the device 100, and the second object is viewed by a different imaging sensor (not shown) on the back of the device 100.

In some embodiments, one or both of the PIPs 116, 118 may display images or videos from a different video source. For instance, the second PIP 116 may show a video that is being recorded or transmitted by a recording or transmitting device that is different from the device 100. In some embodiments, the second PIP 116 shows a video recorded or being recorded with another mobile phone.

In some embodiments, the main video 105 and/or one or both of the videos in the PIPs 116, 118 may be separated from each other. In some embodiments, the videos in the main video 105 and/or one or both of the PIPs 116, 118 may each be recorded in separate video files. In some embodiments, playback of a main video 105 with one or both of the PIPs 116, 118 may show various combinations of the main video 105 and the PIPs 116, 118. For example, on playback, only the main video 105 may be displayed, or the main video with one or both of the PIPs 116, 118 may be displayed, or only the first PIP 118 or second PIP 116 may be displayed. In some embodiments, when one or more of the PIPs 116, 118 are displayed, they may be the same size as when recorded or originally viewed. In another embodiment, when one or more of the PIPs 116, 118 are displayed, they may be larger than when recorded or originally viewed. For example, if only the first PIP 118 is displayed, it may take up the entire display on which it is being viewed. Or, for instance, if both the first and second PIPs 116, 118 are being displayed, they may each take up half, or other proportions, of the display of the device on which they are being viewed.

The first object 112 as shown appears as a star-shaped object. The first object 112 may be any number of items, including an airplane, a bicycle, a person, a car, etc. The first object 112 may be manually selected by a user, for instance, by touching the location of the first object 112 on the screen of a touch screen device such as a mobile phone. The first object 112 may also be automatically selected. For instance, object recognition features such those disclosed in U.S. Patent Application Pub. No. 2013/0335575, the entire contents of which are herein incorporated in their entirety and which discloses features for detecting objects on the fly by using the edges of the object, U.S. Pat. No. 8,254,699, the entire contents of which are herein incorporated in their entirety and which discloses an object recognition algorithm for videos, U.S. Pat. No. 8,064,685, the entire contents of which are herein incorporated in their entirety and which discloses features for 3D object recognition, may be used. In some embodiments, selection of the first object 112 may be verified. For example, the device 100 may ask for verification of the selection of the first object 112. In some embodiments, the first object 112 may be selected remotely. For instance, the display 110 may show a scene that is viewed over an internet connection, such as a scene viewed by a security camera that is transmitted to the display 110. The first object 112 could then be selected, for example, by touching the area of a touchscreen on a mobile phone display where the first object 112 is located.

In some embodiments, the device 100 may capture and/or record the first object 112, which may move relative to the device 100. For example, the first object 112 may move while the device 100 is stationary, or the first object 112 may be stationary while device 100 is moving, or both may be moving. In some embodiments, the first object 112 may be selected, either manually or automatically, then leave the field of view of the device 100, and then be automatically recognized again when it returns to the field of view of the device 100. The first object 112 may be shown in the first PIP 118 when it is in the field of view. When the first object 112 is not in the field of view, the first PIP 118 may not be shown. In some embodiments, the first PIP 118 is blank or shows the location in the display 110 where the first object 112 was last in the field of view. The first PIP 118 may also display a message, such as "Out of Field of View," when the first object 112 leaves the field of view.

In some embodiments, the first object 112 may be tracked as it moves. As shown, the first object 112 may be tracked as it moves around on the display 110. As the first object 112 moves within the field of view of the display 110, it is continually shown in the first PIP 118. In some embodiments, the second object (not shown) may also be tracked. In some embodiments, tracking systems are integrated with the present disclosure. For example, U.S. Pat. No. 8,483,437, the contents of which are incorporated herein in their entirety, discloses features for tracking objects in images using training images; U.S. Patent Application Pub. No. 2013/0258141, the contents of which are incorporated herein in their entirety, discloses features for detecting and tracking an object in video frames and rejecting false positives; U.S. Patent Application Pub. No. 2013/0176203, the contents of which are incorporated herein in their entirety, discloses features for tracking an object in video frames to generate a tacking result; and U.S. Pat. No. 8,249,299, the contents of which are incorporated herein in their entirety, discloses features for identifying and tracking objects in a video.

In some embodiments, the first displayed object 124 in the first PIP 118 may be zoomed in or out compared to its zoom level in the main video 105. Thus the first displayed object 124 in the first PIP 118 may appear larger or smaller as compared to the first object 112 in the main video 105. The first displayed object 124 may also be zoomed to the same extent and thus appear to be the same size in the first PIP 118 as the first object 112 in the main video 105. In some embodiments, the zoom level of the first displayed object 124 in the first PIP 118 may be automatically maintained by the recording system. Thus, for example, if the first object 112 is moving away or otherwise becoming smaller as shown in the main video 105, the first PIP 118 may maintain a constant size of the first displayed object 124 by continuing to zoom in on the first object 112 as it becomes smaller on the main video 105. Likewise, if the first object 112 is becoming larger as shown in the main video 105, the first PIP 118 may maintain a constant size of the first displayed object 124 by continuing to zoom out from the first object 112 as it becomes larger on the main video 105. In some embodiments, the original zoom level at which the zoom is maintained by the first PIP 118 may be chosen automatically by the device 100, manually by a user, or a combination thereof. For instance, a particular zoom level of an item of interest in the first PIP 118 may initially be manually chosen by the user and then as the item moves away or toward the device 100, then the device 100 may automatically maintain the initially manually chosen level of zoom. It is understood that "zoom" as used hererin may refer to zoom while recording an object as well as zoom of a recorded object. Thus, discussion of zoom features herein applies to videos being recorded as well as to videos that have been recorded and are now being shown on the display 110.

In some embodiments, the first object 112 is inside of a region of interest (ROI) 114 on the display 110. The ROI 114 may move with the first object 112 as the first object 112 moves in the display 110. As shown in FIG. 1, the ROI 114 may be configured as a dashed box that captures the first object inside of the box. In some embodiments, the ROI 114 may be configured as different shapes, sizes or lines. For example the ROI 114 may be shown as a solid, thicker line that more tightly circumscribes the contour of the first object 112 on the display 110. For any configuration of the ROI 114, a margin may be defined that leaves a specified amount of distance between the first object 112 and the ROI 114. For example, a margin of a half inch may be specified, wherein a half inch as seen on the display would be between a boundary of the first object 112 and the ROI 114 at all times.

In some embodiments, the first PIP 118 takes up a portion of the display 110 that is less than the whole display 110. As shown, the first PIP 118 may be in the upper left corner of the display 110. The first PIP 118 may also be located in any area of the display 110, such as the bottom left corner, top right corner, bottom right corner, in the middle of the display, centered along one of the edges of the display 110, etc.

In some embodiments, the two PIPs 116, 118 may be resized. For example, the second PIP 116 may be expanded to the size shown by resized PIP 122. The second PIP 116 may thus have larger dimensions in four directions. The second PIP 116 may also have smaller dimensions, as well as different shapes, line weightings, etc. For example, the boundary of the second PIP 116 may be dashed as shown by the boundary of the resized PIP 122.

In some embodiments, the PIP windows may be moved to different locations. In some embodiments, the PIP windows may move manually. In some embodiments, the PIP windows may move automatically, as is discussed in further detail herein, for example with respect to FIGS. 2, 8 and 9.

Figure 2:
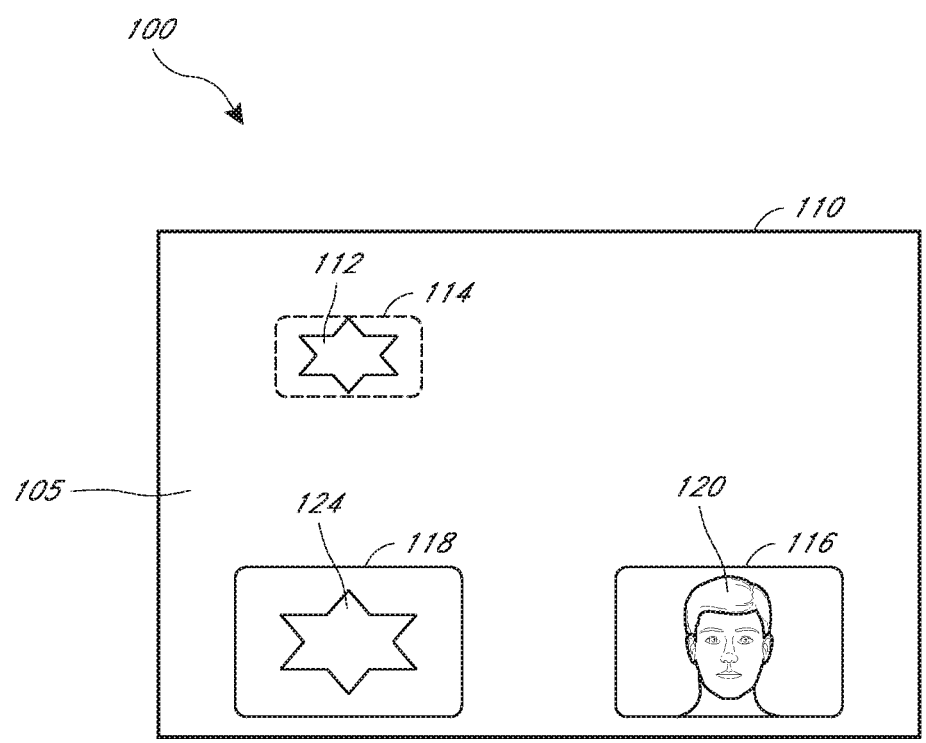
FIG. 2 depicts a front view of the display of FIG. 1 where the PIP tracking the object has moved to avoid interfering with the tracked object on the display.

Turning to FIG. 2, an embodiment is shown of the device 100 with the display 110 where the first PIP 118 displaying the first object 112 has moved to avoid interfering with the first object 112 as the first object 112 moves around with respect to its position on the display 110. The first object 112 may be moving on the display 110 because the first object 112 moves relative to the display 110. In one instance the first object 112 may be moving and the display 110 is stationary. Alternatively, the first object 112 may be stationary and the display 110 is moving by the viewer. In another embodiment, both the first object 112 and the display may be moving.

In some embodiments, the system may move the position of the first PIP 118 displaying the first object 112 to avoid interfering with a selected object or area of the display 110. In some embodiments, the first PIP 118 may move to avoid interference with the first object 112. In some embodiments, this movement is automatic such that the first PIP 118 will move without any input from a viewer of the display 110. In some embodiments, the system is programmed to move the position of the first PIP 118 when a boundary of the first object 112 touches the boundary of the first PIP 118. In some embodiments, the first PIP 118 will move when a boundary of the first object 112 is within a certain distance of the boundary of the first PIP 118. For example, the position of the first PIP 118 may move when a boundary of the first object 112 is within a half an inch of the boundary of the first PIP 118 on the display 110. In some embodiments, the position of the first PIP 118 will move when a boundary of the ROI 114 is touching the boundary of the first PIP 118. In some embodiments, the position of the first PIP 118 will move when a boundary of the ROI 114 is within a certain distance of the boundary of the first PIP 118. For example, the position of the first PIP 118 may move when a boundary of the ROI 114 is within a half an inch of the boundary of the first PIP 118 as shown on the display 110. Many other configurations may be implemented to determine how close the first object 112, ROI 114, or other selected objects or locations must be to the first PIP 118 in order for the system to automatically move the position of the first PIP 118. Therefore, by "interference" it is meant that the first PIP 118 is within a specified proximity to the first object 112 or ROI 114 or other indicated location of the display 110. Interference therefore need not only occur when the first PIP 118 obscures the view of the first object 112, or a portion thereof, on the display 110. Interference may thus also occur when the first PIP 118 is not obscuring the view of the first object, or a portion thereof, on the display 110. Further, any reference herein to interference with the first object 112, or any other object, includes interference with other objects or locations of the display 110, unless indicated otherwise by context.

In some embodiments, the system may alter the appearance of the first PIP 118 to facilitate viewing the first object 112 on the display 110 when it interferes with the first PIP 118. In some embodiments, the first PIP 118 may disappear when there is interference and reappear when there is no longer interference. In some embodiments, the first PIP 118 may become transparent when there is interference. For example, the first PIP 118 may become fifty percent transparent such that the first object 112 may still be viewed when it interferes with the first PIP 118.

In some embodiments, the location or locations on the display 110 to which the first PIP 118 moves when it interferes with the first object 112 may be repeated. For instance, the first PIP 118 may always move to the same second location, such as the lower left corner, when it interferes with the first object 112. The first PIP 118 may then move back to its original location if it interferes with the first object 112 in this second location. Thus, the first PIP 118 may have as a first location that shown in FIG. 1, while it may have as a second location that shown in FIG. 2.

In some embodiments, the location or locations on the display 110 to which the first PIP 118 moves when it interferes with the first object 112 may be random. For instance, the first PIP 118 may move from its original location to a random second location when it interferes with the first object 112. The first PIP 118 may then move to a random third location, which may or not be the same as the original location, if it interferes with the first object 112 in this second location. Thus, the first PIP 118 may have as a first random location that shown in FIG. 1, while it may have as a second random location that shown in FIG. 2.

In some embodiments, the location or locations on the display 110 to which the first PIP 118 moves when it interferes with the first object 112 may be controlled. For instance, when the first PIP 118 interferes with the first object 112, the first PIP 118 may move from its original location to a second location that is not interfering with other objects or specified areas on the display 110. In some embodiments, when the first PIP 118 interferes with the first object 112, the first PIP 118 may move to a location where the first PIP 118 will not interfere with the first object 112 or with the second PIP 116. In some embodiments, if a second object is also shown on the display 110, then, if the first PIP 118 interferes with the first object 112 and/or the second object, the first PIP 118 may move to a location where the first PIP 118 will not interfere with the first object 112, with the second PIP 116, or with the second object. Many other configurations of avoiding interference between the various PIPs and other specified objects or locations on the display 110, though not explicitly addressed herein, are within the ordinary skill of the art and are thus within the scope of the present disclosure. For instance, instead of or in addition to the first object 112, the first PIP 118 may also avoid interference with a specified location or locations of the display 110, such as the top edge, the right edge, etc.

Figure 3:
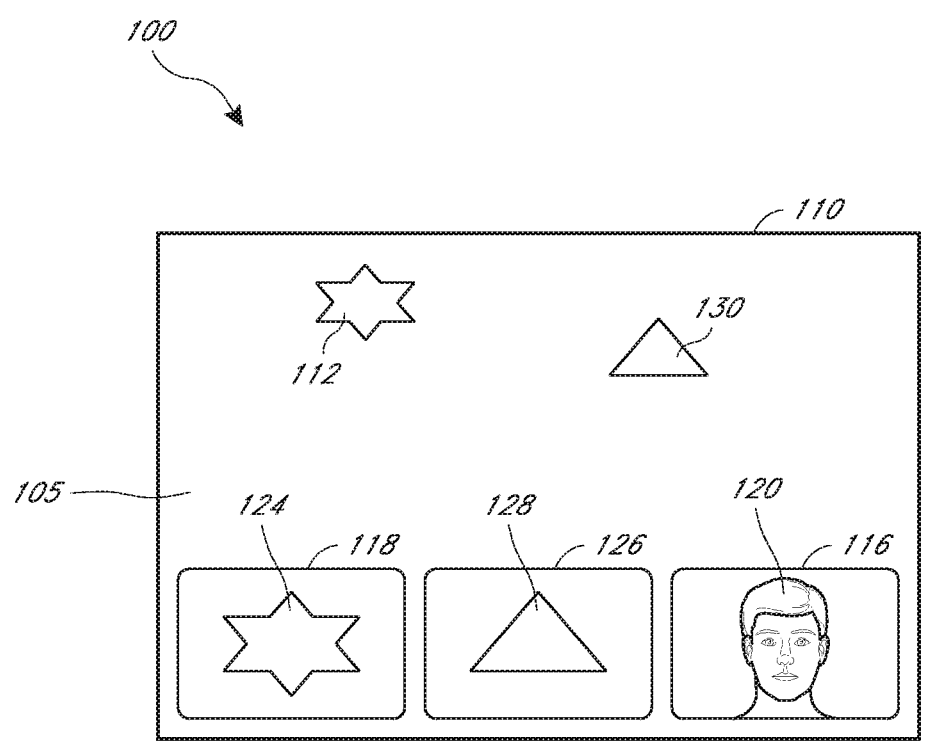
FIG. 3 depicts a front view of the display of FIG. 1 with three PIPs, where two of the PIPs are displaying tracked objects.

Turning now to FIG. 3, an embodiment is shown of the device 100 with the display 110 having three PIPs 116, 118, 126. As shown, the first PIP 118, the second PIP 116 and a third PIP 126 may be shown on the display 110. In some embodiments, each PIP may display separate objects. As shown, the first PIP 118 may display the first displayed object 124, shown as a star-shaped object, the second PIP 116 may display the second displayed object 120, shown as a face, and the third PIP 125 may display a third displayed object 128, shown as a triangular-shaped object.

In some embodiments, the first object 112 and/or the third object 130 may be tracked as they move. The ROIs 114 surrounding the tracked objects need not be shown in the display 110. In some embodiments, the PIPs 116, 118, 126 may move to avoid interfering with the objects 112, 130 on the display 110. This may occur despite the ROIs 114 not being visible around the objects on the display 110.

As shown in FIG. 3, in some embodiments, the three PIPs 116, 118, 126 are aligned near the bottom edge of the display 110 as shown. To avoid interference with objects of interest on the display 110, the system may move the position of the PIPs to other locations on the display 110. The PIPs may move individually or as a group. For example, only the first PIP 118 may move to the top left corner of the display 110 to avoid interfering with an object of interest, or all three PIPs 116, 118, 126 may align near a different edge of the display 110 to avoid interfering with an object of interest.

Embodiments with three PIPs 116, 118, 126 possess the same capabilities and features as other embodiments with only two PIPs. For example, the three PIPs 116, 118, 126 can similarly be resized, manually or automatically relocated, have changed transparency properties, may show tracked objects, may show objects from the same or from different fields of view, may display objects from different video sources, etc. Any features discussed above with respect to embodiments with two PIPs, though not explicitly addressed with respect to embodiments with three PIPS, may also be implemented, mutatis mutandis, in embodiments with three PIPs. Similarly, any features discussed with respect to embodiments with three PIPs, though not explicitly addressed with respect to embodiments with two PIPS, may also be implemented, mutatis mutandis, in embodiments with two PIPs.

Figure 4:
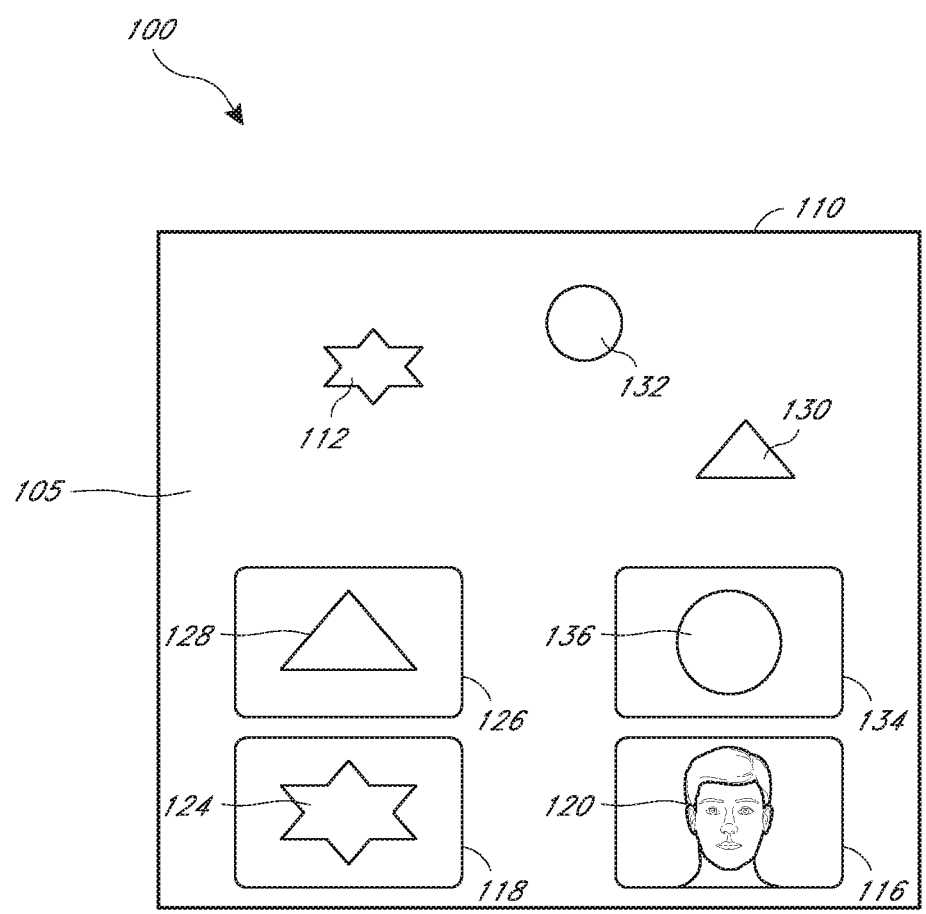
FIG. 4 depicts a front view of the display of FIG. 1 with four PIPs, where three of the PIPs are displaying tracked objects.

Turning now to FIG. 4, an embodiment is shown of the device 100 with the display 110 having four PIPs 116, 118, 126, 134. Four PIPs may be desirable, for instance, when viewing and/or recording a sports match with four different players, such as a two on two volleyball game. In such cases, each PIP could follow a different player and record them each in their own PIP. Such a use may be helpful for post-game analysis of the individual players. While an embodiment with four PIPs may be described, it is understood that more than four PIPs are also within the scope of the present disclosure. More than four PIPs may be useful, for example, when recording and/or viewing microscopic images, such as a cluster of microorganisms, or viewing many objects, such as a herd of many animals. The various PIP's may be used to individually track the many microorganisms or animals of interest.

As shown in FIG. 4, the first PIP 118, the second PIP 116, the third PIP 126 and a fourth PIP 134 may be shown on the display 110. In some embodiments, each PIP may display separate objects. As shown, the first PIP 118 may display the first displayed object 124, shown as a star-shaped object, the second PIP 116 may display the second displayed object 120, shown as a face, the third PIP 126 may display a third displayed object 128, shown as a triangular-shaped object, and the fourth PIP 134 may display a fourth displayed object 136, shown as a circular-shaped object.

In some embodiments, the display 110 may toggle between displaying two, three and four PIPS. For instance, at one time, the display 110 may only show the first PIP 118 and the second PIP 116. At a later time, the display 110 may also show the third PIP 126 and/or the fourth PIP 134. Further, different combinations of PIPs may be shown over time. For example, at one time, the display 110 may only show the first and third PIPs 118, 126. At later times, the display 110 may only show the second and fourth PIPs 116, 134. Other combinations are within the scope of the present disclosure. Further, any combinations that may be shown may be automatically hidden and/or shown on the display 110, or they may be manually hidden and/or shown, for instance by a user of the display device.

In some embodiments, the display 110 may toggle between displaying two, three and four PIPS due to objects of interest leaving the field of view of the device 100. For instance, if the first object 112 leaves the field of view of the device 100 shown on the display 110, then the first PIP 118, which was showing the first object 112 as first displayed object 124, may disappear from the display 110. If the first object returns to the field of view shown on the display 110, then the first PIP 118 may reappear on the display 110. In some embodiments, the first PIP 118 may become transparent when the first object 112 leaves the field of view shown on the display 110. Other actions related to the appearance and/or movement of the PIPs may occur due to objects leaving and/or returning to the field of view shown on the display 110. Similar features and capabilities apply to other PIPs that may be showing objects from a different field of view. For example, the second PIP 116 may show a second displayed object 120 from a different field of view than the field of view shown on the display 110. If the second object corresponding to the second displayed object 120 disappears from that different field of view, then the second PIP 116 may disappear, become transparent, resize, etc.

As used herein, "field of view" is used with its ordinary and usual meaning, including the things which are generally in the view or sight of an imaging sensor on a display device. It is also understood to be the field of view of the device that captured and/or recorded the video. This may or may not be the device 100. For instance, the device 100 may show the recording, but a different device may have taken the recording. It is also possible that the device 100 captured and/or recorded the video and is now also showing the video. Therefore, "field of view" as used herein is not limited to only the field of view of one display device or the other.

Embodiments with four PIPs 116, 118, 126, 134 possess the same abilities and features as other embodiments with only two or three PIPs, as discussed above. For example, the four PIPs 116, 118, 126, 134 can similarly be resized, manually or automatically relocated, have changed transparency properties, may show tracked objects, may show objects from the same or from different fields of view, may display objects from different video sources, etc. Any features discussed above with respect to embodiments with two or three PIPs, though not explicitly addressed with respect to embodiments with four PIPS, may also be implemented, mutatis mutandis, in embodiments with four or more PIPs. Similarly, any features discussed with respect to embodiments with four PIPs, though not explicitly addressed with respect to embodiments with two or three PIPS, may also be implemented, mutatis mutandis, in embodiments with two, three or more than four PIPs.

Figure 5:
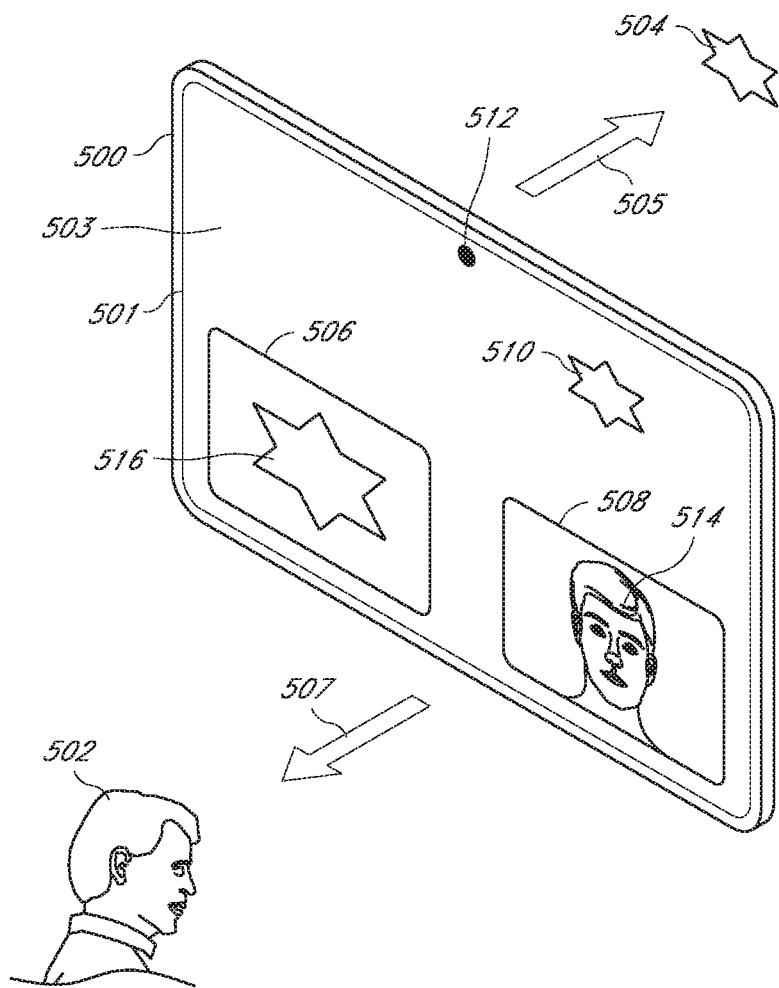
FIG. 5 depicts a perspective view of an embodiment of a tablet with a display showing two PIPs, where each PIP is displaying an object from a different field of view.

The various embodiments of the display 110 discussed with respect to FIGS. 1-4 may be embodied on a wide range of devices and systems. FIG. 5 depicts an embodiment of one such device 500. In addition to the discussion that follows, the device 500 may incorporate any of the features of the various components as discussed above with respect to FIGS. 1-4, including tracking objects, resizing and/or relocating PIPs, changing PIP properties such as transparency, displaying the PIPs in different configurations, etc.

Referring now to FIG. 5, in some embodiments, the device 500 may be a mobile device, such as a tablet as shown, or a handheld, portable, laptop or desktop computer. The device 500 may be a small, handheld computing device, with a display screen with touch input and/or a miniature keyboard, weighing less than 2 pounds (0.91 kg). The device 500 may also be manufactured by companies such as Apple®, Nokia®, HTC®, LG®, BlackBerry®, and Motorola Mobility®.

In some embodiments, the device 500 has an operating system (OS), and can run various types of application software, such as apps or applications. The device may be equipped with Wi-Fi, Bluetooth, and GPS capabilities that can allow connections to the Internet and other Bluetooth-capable devices, such as an automobile or a microphone headset. One or more imaging sensors 512, which may be a camera or cameras, or a media player feature for video and/or music files may be on the device 500 along with a stable battery power source such as a lithium battery.

In some embodiments, the device 500 may be a smartphone. This may be a mobile phone built on a mobile operating system, with advanced computing and connectivity capabilities. It may combine the functions of a personal digital assistant (PDA), email functionality, and a mobile phone. The device 500 may also have the functionality of portable media players, low-end compact digital cameras, pocket video cameras, and GPS navigation units to form one multi-use device 500. In some embodiments, the device 500 also includes a high-resolution touchscreen and web browsers that display standard web pages as well as mobile-optimized sites. High-speed data access may be provided by Wi-Fi, mobile broadband, near field communication (NFC) and/or Bluetooth.

The device 500 shown in FIG. 5 includes a display 501 showing a main video 503 and two PIPs 506, 508, where each PIP is displaying objects from different fields of view. A first PIP 506 displays a first viewed object 504 as a first displayed object 516 inside the first PIP 506. A second PIP 508 displays a second viewed object 502 as a second displayed object 514 inside the second PIP 508.

In some embodiments, the first viewed object 504, a star-shaped object, may be in a field of view that is in a first direction 505 relative to the device 500, as depicted. The second viewed object 502, such as a user of the device 500, may be in a field of view that is in a second direction 507 relative to the device 500, as depicted. As shown, the directions 505, 507 of the two fields of view of the device 500 are in opposite directions. The field of view in the direction 507 is viewed by an imaging sensor 512, which may be a camera. The field of view in the opposite direction 505 is viewed by an imaging sensor (not shown), which may be another camera, on the opposite side of the device 500 as that of the imaging sensor 512. Therefore, the first displayed object 516 in the first PIP 506 is from a different field of view of the second displayed object 514 in the second PIP 508.

As further shown in FIG. 5, the main video 503 may display objects from the field of view in the direction 505. The first PIP 506 displays the first viewed object 504 which is in that same field of view. However, the second PIP 508 displays the second viewed object 502 from the field of view in the direction 507. The two PIPs 506, 508 are overlaid onto the main video 503. In some embodiments, the PIPs 506, 508 completely obscure the parts of the main video 503 that are "behind" or "underneath" the PIPs 506, 508. In some embodiments, the PIPs 506, 508 partially obscure the parts of the main video 503 that are "behind" or "underneath" the PIPs 506, 508. In some embodiments, the PIPs 506, 508 are transparent to some percentage, such as 25%, 50%, 75% etc.

The various videos or objects being shown by the various PIPs by the devices, systems and methods disclosed herein may also be connected with other video sources or displays. As mentioned, the videos shown in the PIPs may originate from a device or source other than the device on which the PIPs are being shown. Further, in some embodiments, the videos shown in the PIPs on one device may also be shown on other devices and/or displays. This is discussed in further detail herein, for example with respect to FIG. 6.

Figure 6:
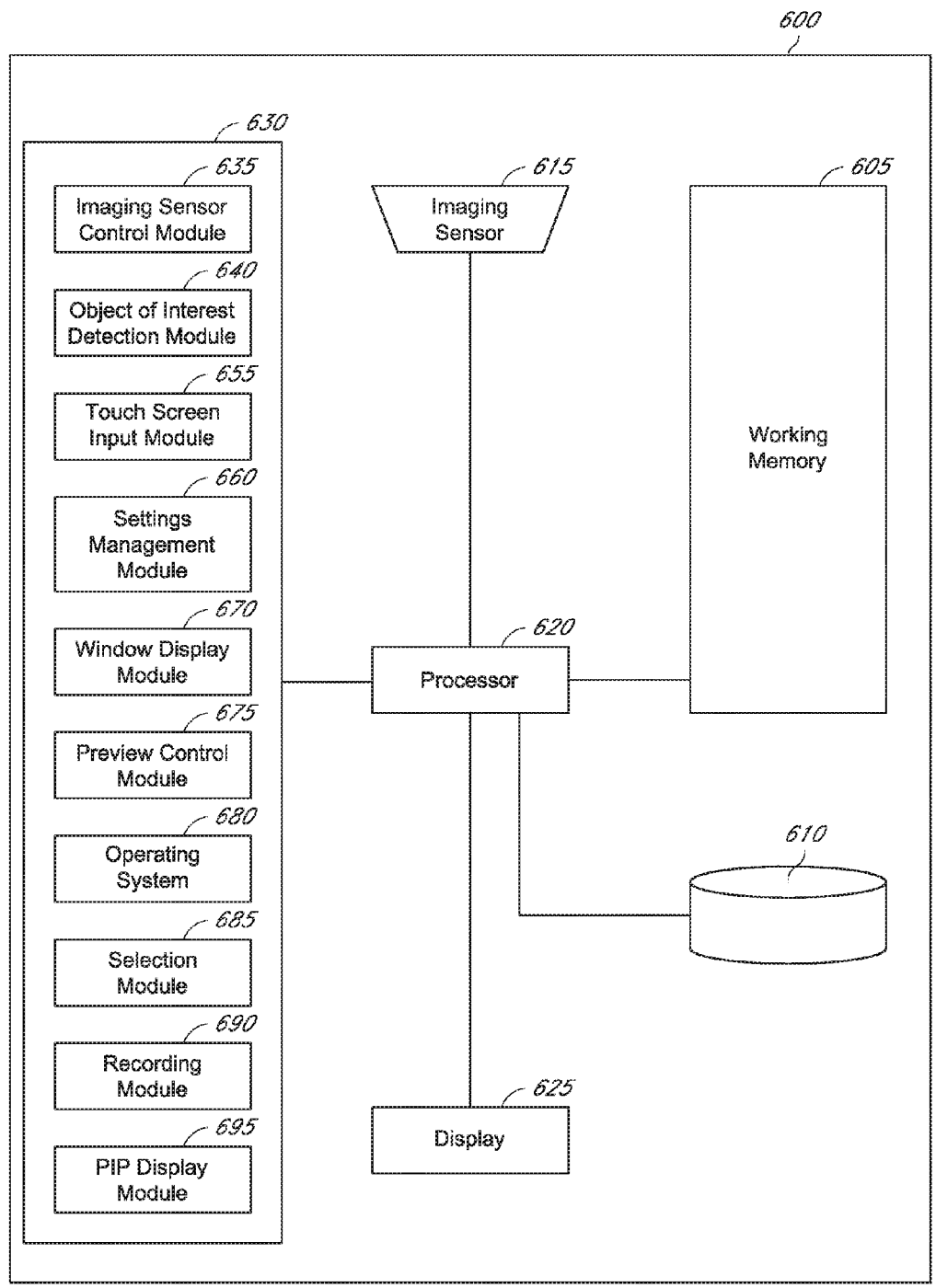
FIG. 6 depicts a block diagram of a display device comprising a recording system having modules for displaying, recording and managing multiple PIPs.

The various devices and systems discussed above may be embodied in software and/or hardware in a number of display configurations. FIG. 6 depicts a block diagram of one such embodiment of a device 600 with a display 625. In some embodiments, the device 600 may be a mobile device, such as those discussed above with respect to FIG. 5. The device 600 may also be a cell phone, digital camera, personal digital assistant, or the like. It may also be a more stationary device such as a desktop personal computer, video conferencing station, or the like. The device 600 may comprise a recording system having modules for displaying, recording and/or managing multiple PIPs.

As shown, the device 600 has a set of components including a processor 620 linked to an imaging sensor 615. A working memory 605, storage 610, electronic display 625, and memory 630 containing various modules are also in communication with the processor 620. In some embodiments, the processor 620 may be a general purpose processing unit or a processor specially designed for imaging applications. As shown, the processor 620 is connected to the working memory 605 and the memory 630. The modules in memory 630 may be software, such as programs or applications. A plurality of modules may be in the device 600. These modules include instructions that configure the processor 620 to perform various image processing and device management tasks. The modules may include modules related to PIP, as well as traditional photographic applications, high dynamic range imaging, panoramic video, or stereoscopic imaging such as 3D images or 3D video. In the embodiment shown, the memory 630 stores an imaging sensor control module 635, object of interest detection module 640, touch screen input module 655, settings management module 660, window display module 670, preview control module 675, operating system 680, selection module 685, recording module 690, and PIP display module 695. The working memory 605 may be used by processor 620 to store a working set of processor instructions contained in the modules of memory 630. Alternatively, working memory 605 may also be used by processor 620 to store dynamic data created during the operation of device 600.

In some embodiments, the processor 620 is configured by the several modules stored in the memory 630. The imaging sensor control module 635 may include instructions that configure the processor 620 to capture images with imaging sensor 615. The imaging sensor control module 635 may also include instructions that adjust the focus position of imaging sensor 615. Therefore, processor 620, along with image capture control module 635, imaging sensor 615, and working memory 605 represent one means for capturing an image using an imaging sensor. Recording module 690 may include instructions that configure the processor 620 to record the captured images. Touch screen input module 655 may include instructions that configure the processor 620 to receive touch inputs from a touch screen display, for example, display 625.

The object of interest detection module 640 provides instructions that configure the processor 620 to detect an object of interest in the images captured by imaging sensor 615. In some embodiments, an object of interest may be a human body part, such as a face. Thus the object of interest detection module 640 may implement features for facial recognition. For instance, U.S. Pat. No. 8,452,107, the entire contents of which are herein incorporated by reference, discloses features for occlusion tolerant face recognition; U.S. Patent Application Pub. No. 2011/0047384, the entire contents of which are herein incorporated by reference, discloses features for establishing an ad hoc network using face recognition; U.S. Pat. No. 7,916,976, the entire contents of which are herein incorporated by reference, discloses a facial-based image organization and retrieval method; and U.S. Patent Application Pub. No. 2010/0239130, the entire contents of which are herein incorporated by reference, discloses features for rapid facial recognition. 655620625

The settings management module 660 may include instructions to manage various parameter settings for device 600. For example, parameters related to the configuration of the various PIPs may be managed by module 660. The window display module 670 may include instructions to manage the layout of data, such as zoom level, within the PIPs generated on display 625 on device 600. For example, the display 625 may include more than one image "window," such as a PIP, within it. Some "windows" may display data at differing scales. Instructions within window display module 670 may configure the processor to translate data related to each of these sub windows into display commands for display 625.

The preview control module 675 includes instructions that configure the processor 620 to display a preview window on the display 625 according to the methods described above. For example, the preview control module 675 may include instructions that call subroutines in the imaging control module 635 in order to configure the processor 620 to capture a first image using the imaging sensor 615. The preview control module 675 may then call the object of interest detection module 640 to detect objects of interest in a first image captured by the imaging sensor 615. Instructions in the preview control module 675 may then invoke the settings management module 660 to determine how the operator has configured the preview window to display on the display 625, for example, in a PIP. This information may be provided to the window display module 670, in order to layout the preview window as a PIP or as otherwise configured using the image data captured by imaging sensor 615 and the object of interest information determined by object of interest detection module 640. Window display module 670 may invoke instructions in operating system 680 to control the display and cause it to display the appropriate preview window configuration on electronic display 625. The preview control module 675 may also include instructions that configure the processor 620 to verify, or seek verification from a user, of selected and/or detected objects of interest on display 625.

The operating system module 680 configures the processor 620 to manage the memory and processing resources of device 600. For example, the operating system module 680 may include device drivers to manage hardware resources such as the display 625, storage 610, or imaging sensor 615. Therefore, in some embodiments, instructions contained in the modules discussed above may not interact with these hardware resources directly, but instead interact through standard subroutines or APIs located in operating system component 680. Instructions within operating system 680 may then interact directly with these hardware components.

In some embodiments, the operating system module 680 is a mobile operating system and the device 600 is a mobile device. The mobile operating system used by the mobile device, such as a smartphone, may be Google's Android, Apple's iOS, Symbian, Blackberry Ltd's BlackBerry 10, Samsung's Bada, Microsoft's Windows Phone, Hewlett-Packard's webOS, embedded Linux distributions such as Maemo and MeeGo, Mozilla's Firefox OS, Canonical Ltd.'s Ubuntu Phone, Tizen, or others. The mobile device can receive multiple operating system module 680 updates over its lifetime.

The processor 620 may write data to the storage module 610. While the storage module 610 is represented graphically as a traditional disk device, those with skill in the art understand multiple embodiments could include either a disk based storage device or one of several other type storage mediums to include a memory disk, USB drive, flash drive, remotely connected storage medium, virtual disk driver, or the like.

Although FIG. 6 depicts a device comprising separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 6 illustrates two memory components, to include memory component 630 comprising several modules, and a separate memory 605 comprising a working memory, one with skill in the art would recognize several embodiments utilizing different memory architectures. For example, the device 600 may have a design that utilizes ROM or static RAM memory for the storage of processor instructions implementing the modules contained in memory 630. Alternatively, processor instructions may be read at system startup from a disk storage device that is integrated into the device 600 or connected via an external device port. The processor instructions may then be loaded into RAM to facilitate execution by the processor. For example, working memory 605 may be a RAM memory, with instructions loaded into working memory 605 before execution by the processor 620.

In some embodiments, the display 501 depicted in FIG. 5 may be the display 625 on the device 600 depicted in the block diagram of FIG. 6. For example, referring to FIGS. 5 and 6, the imaging sensor 615 on the device 600 may sense an image of the items in the field of view in direction 505. The imaging sensor 615 may then transmit this sensed data to a linked processor 620. The image data may then be communicated to the working memory 605, the storage module 610, the electronic display 625, or the various components of memory 630. In some embodiments, items in the field of view in direction 505 may be analyzed and/or selected for possible display in the first PIP 506 using the object of interest detection module 640 and/or PIP display module 695. The object of interest detection module 640 may communicate data related to the first viewed object 504 to the processor 620 which may then display the first object 516 in the main video 503. The first object 516 may be selected on the display 501 by, for example, the touch screen input module 655. A user of device 600 may touch the area of the display 501 corresponding to the first object 516. The touch screen input module 655 may then take this input and communicate it to the processor 620 for further processing. The first PIP 506 may be moved or resized using the PIP display module 695 or the window display module 670. In some embodiments, tracking of the first object 510 in the first PIP 506 may be indicated by the settings management module 660 and carried out by the imaging sensor control module 635 or the object of interest detection module 640.

Any of the functions that may be carried out with the modules of FIG. 6 involving the first object 510 in the first PIP 506 may also be carried out on the second displayed object 514 in the second PIP 508. Further, the various sets of instructions in the modules of FIG. 6 to be carried out on the various features shown in FIG. 5 may be carried out by various modules and need not be limited to just one module for one capability. For instance, while the object of interest detection module 640 may be used to detect the first object 510, it is understood that another module, for instance the window display module 670 may instead or in addition provide this functionality. It is therefore understood that the functionalities recited of the various modules and components of FIG. 6 as applied to the features of FIG. 5 are not the sole modules or components capable of carrying out the aforementioned functions but are merely listed as examples of how the disclosed implementations may be implemented.

Figure 7:
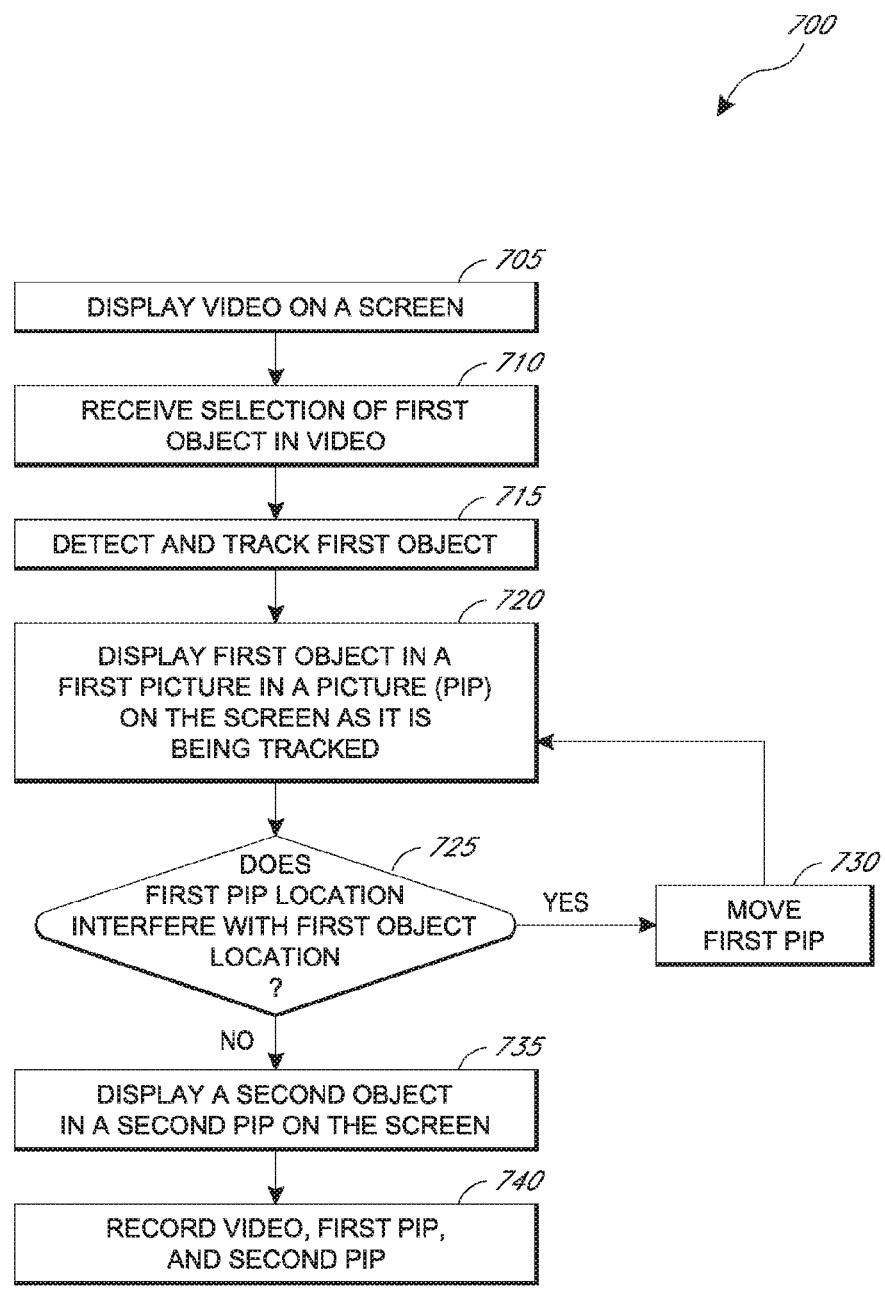
FIG. 7 is a flow chart diagramming one embodiment of a method for displaying and recording two PIPs on a display, where the position of the first PIP moves if it is interfering with the tracked object it is displaying.

Turning to FIG. 7, a flow chart is shown that diagrams one embodiment of a process or method 700 for displaying and recording two PIPs on a display, where the first PIP may automatically move if it is interfering with the tracked object it is displaying. The process 700 may begin with step 705 wherein a video is displayed on a screen or display of a device. The video may be recorded or currently recording, i.e. taped or live. Further, a live video displayed may be from the same device displaying the video, or it may be from a different device. Similarly, a taped or recorded video displayed may have been captured and/or recorded by the same device displaying the video, or it may have been captured and/or recorded by a different device. The video displayed in step 705 may comprise one or several objects of interest, which may be moving or stationary.

The process 700 then moves to step 710 wherein a selection of a first object in the video is received. In some embodiments, the selection of the first object may be received by a user touching a screen or display where the first object is currently located on the display. In some embodiments, the selection of the first object may also be received by receiving information identifying the first object. For example, a description of the first object may be stored in the device. In some embodiments, selecting a first object includes creating a region of interest (ROI) that includes the first object. For example, a visible box on the display may be formed around the first object, indicating that the object in the region has been selected. In some embodiments, the region is not visible.

The process 700 then moves to step 715 wherein the first object is detected and tracked. In some embodiments, the first object is detected as the object that was selected in the previous step 814. For example, a selected object may then be detected and tracked thereafter. In some embodiments, information identifying the first object may be received, and when the first object is on the display it may be detected and identified as the first object. In some embodiments, the selection of the first object is automatic. For instance, the first object's identity may be stored, match an object on the display, and thereafter be automatically selected. The first object may also thereafter leave the display, and, upon returning to the display, be again detected and tracked.

The process 700 then moves to step 720 wherein the first object is displayed in a first PIP on the display. In some embodiments, the first PIP covers a small portion of the display and displays the first object within it. The first PIP may also cover a larger portion of the display. In some embodiments, the first object is tracked as it moves and is continuously displayed in the first PIP while it is still on the display. The first PIP may be situated in any location of the display, including a corner or along an edge of the display.

The process 700 next moves to decision step 725 wherein it is determined whether the location of the first PIP on the display interferes with the location of the first object or other indicated location on the display. In some embodiments, the location of the first PIP on the display interferes with the location of the first object on the display when the first PIP is within a specified proximity to the first object. Interference therefore may occur when the first PIP obscures the view of the first object, or a portion thereof, on the display. Interference may also occur when the first PIP is not obscuring the view of the first object, or a portion thereof, on the display. In some embodiments, the first PIP interferes with the first object when a boundary of the first object is touching the boundary of the first PIP. In some embodiments, the first PIP interferes with the first object when a boundary of the first object is within a certain distance of the boundary of the first PIP. For example, the first PIP may interfere with the first object when a boundary of the first object is within a half an inch of the boundary of the first PIP as seen on the display. In some embodiments, the first PIP interferes with the first object when a boundary of the ROI is touching the boundary of the first PIP. Many other configurations may be implemented to determine how close the first object or ROI must be to the first PIP in order for the first PIP to interfere with the first object. Further, it is understood that discussion of interference with a first object applies similarly to interference with any other indicated object or location on the display that the first PIP may avoid.

If it is determined in decision step 725 that the first PIP interferes with the first object, then the process 700 moves to step 730 where the first PIP is moved or otherwise altered on the display. In some embodiments, the first PIP is moved or relocated to a different location on the display. In some embodiments, this movement is automatic such that the first PIP will move without any input from a user or viewer of the display. In some embodiments, the location or locations on the display to which the first PIP moves may be repeated. For instance, the first PIP may always move to a same second location when it interferes with the first object. The first PIP may then move back to its original location if it interferes with the first object in this second location.

In some embodiments, the location or locations on the display to which the first PIP moves are random. For instance, the first PIP may move from its original location to a random second location. The first PIP may then move to a random third location, which may or not be the same as the original location, and so on.

In some embodiments, the location or locations on the display to which the first PIP moves may be controlled. For instance, the first PIP may move from its original location to a second location that is not interfering with other objects on the display. In some embodiments, the first PIP may move to a location where the first PIP will not interfere with the first object, with a second object, with a second PIP, and/or with any other indicated location of the display which the first PIP may avoid. In some embodiments, if a second object is also shown on the display, then, if the first PIP interferes with the first object and/or the second object, the first PIP may move to a location where the first PIP will not interfere with the first object, with the second PIP, with the second object, or with any other indicated locations. Many other configurations of moving the first PIP, though not explicitly addressed herein, are within the ordinary skill of the art and are thus within the scope of the present disclosure.

In some embodiments of step 730, the first PIP may alter its appearance. This may be for example to facilitate viewing the first object on the display if the first object overlaps with the first PIP. In some embodiments, the first PIP may disappear when there is interference and then reappear. In some embodiments, the first PIP may become transparent. For example, the first PIP 118 may become fifty percent transparent. Further, combinations of relocating and/or altering the appearance of the first PIP may be implemented. Also, any of the features or capabilities related to interference and/or moving as discussed above with respect to FIGS. 1 and 2 may be implemented in the method 700.

After step 730, the method 700 moves to step 720 where it displays the first object in the first PIP. In some embodiments, the first object is displayed in the first PIP as it moves in step 730 and its appearance is therefore continued in step 720. In other embodiments, the first object disappears while the first PIP is moved or altered in step 730 and then reappears once the PIP has stopped being moved or altered in step 720. Further, step 720 may proceed in any of the manners as described above.

If in decision step 725 it is determined that the first PIP location on the display does not interfere with the location of the first object on the display, then the process moves to step 735. In step 735, a second object is displayed in a second PIP on the display. In some embodiments, the second PIP covers a small portion of the display and displays the second object within it. The second PIP may also cover a larger portion of the display. The second PIP may be situated in any location of the display, including a corner or along an edge of the display. In some embodiments, the second PIP is located such that it does not interfere with the first object, the first PIP, the second object, and/or any other indicated location or locations of the display. In some embodiments, the second object is tracked as it moves and is continuously displayed in the second PIP while it is still on the display. In some embodiments, the second object is also in the main video of the display. In some embodiments, the second object is not from the main video but is from another video source. For example, the second object may be from another field of view of the display device or from another display device altogether, such as a different smart phone.

The process 700 may then move to step 740 and record the video, the first PIP, and the second PIP shown on the display. In some embodiments, the video is the main video on the display over which the first and second PIPs are situated. In some embodiments, the video, the first PIP, and the second PIP are all recorded in the same display. For example, the recording may be of the main video with the two PIPs situated over the main video. In some embodiments, the video, the first PIP, and the second PIP are all recorded in different displays or otherwise in different files. For example, the main video may be recorded on one display or file, the first PIP recorded in another display or file, and the second PIP in yet another.

Figure 8:
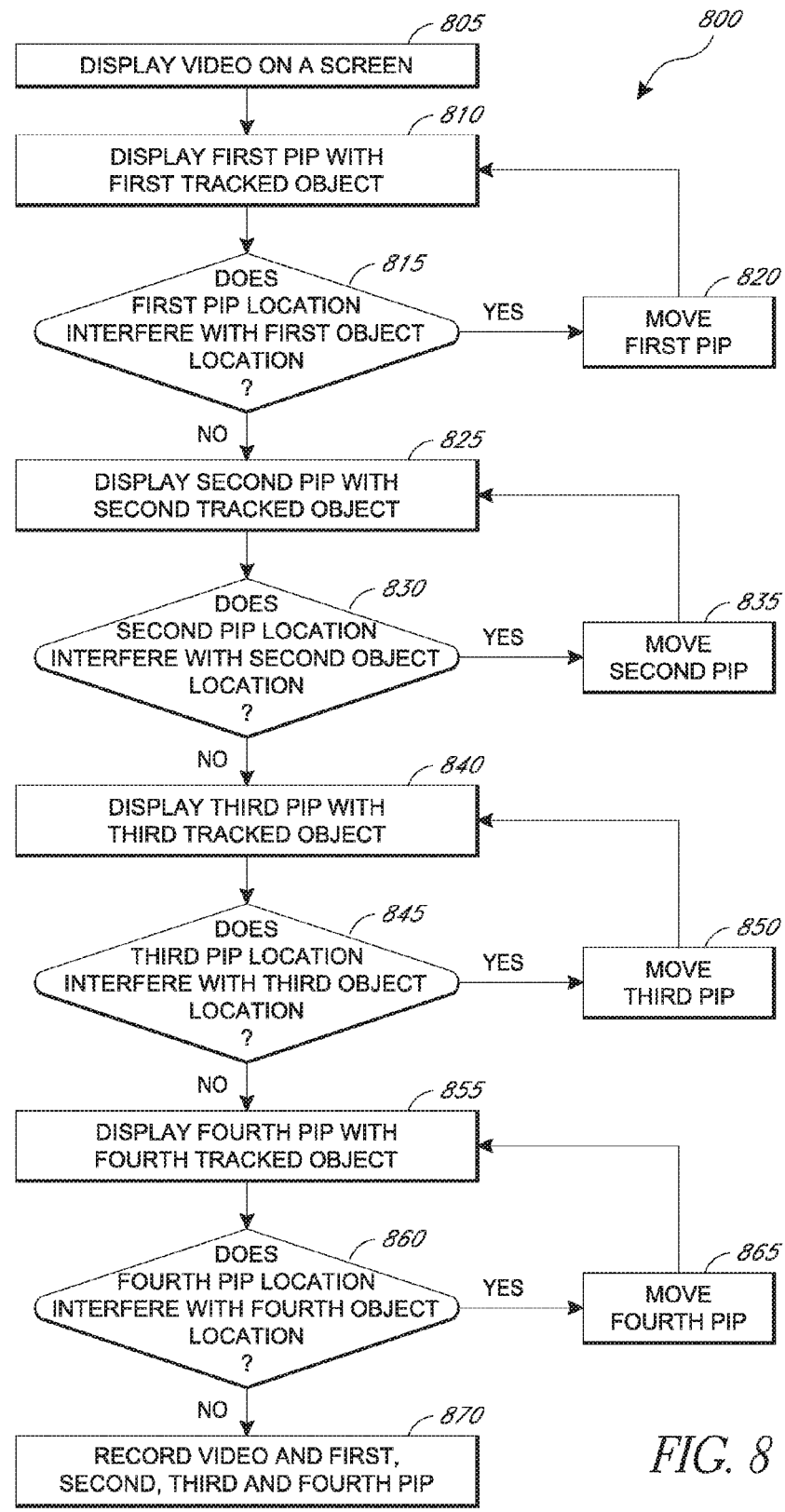
FIG. 8 is a flow chart diagramming one embodiment of a method for displaying and recording four PIPs on a display, where the position of the PIP moves if it is interfering with the respective tracked object it is displaying.

FIG. 8 is a flow chart diagramming one embodiment of a method or process 800 for displaying and recording four PIPs on a display, where each PIP tracks an object and automatically moves if it is interfering with another specified object or a specified location on the display. The process 800 incorporates steps similar to blocks 705, 720, 725 and 730 in the process 700 shown in FIG. 7. For instance, steps 805, 810, 815, and 820 of process 800 are similar to the aforementioned steps, respectively, of process 700. Therefore, it is understood that the descriptions of certain steps above with respect to FIG. 7 apply to similar steps in FIG. 8.

The process 800 begins with step 805 wherein a video on a screen or display of a device is displayed. The video displayed in step 805 may comprise one or several objects of interest, which may be moving or stationary. This step 805 may further include receiving a selection of a first object in the video, detecting the first object, and/or tracking the first object 805 and/or detecting and tracking the first object. The process 800 then moves to step 810 where the first object is displayed in a first PIP on the display. 800 Next, in step 815, it is determined whether the location of the first PIP on the display interferes with the location of the first object on the display. If it is determined in decision step 815 that the first PIP interferes with the first object, then the process 800 moves to step 820 where the first PIP is moved or otherwise altered on the display. After step 820, the method 800 moves to step 810, which may proceed in the manner described above.

If in decision step 815 it is determined that the first PIP location on the display does not interfere with the location on the display of the first object and any other identified objects that it should avoid, then the process moves to step 825. In step 825, a second object is displayed in a second PIP on the display. The process 800 may then proceed in a similar manner for this second PIP, for a third PIP and for a fourth PIP, as described above with respect to the first PIP in steps 810, 815 and 820. The process then reaches decision step 820 wherein it is determined whether the fourth PIP interferes with the location of the fourth object. This decision step 820 includes determining whether the fourth PIP interferes with any other PIPs or any other objects or locations of the display with which it should not interfere.

If it is determined in decision step 860 that the fourth PIP does not interfere with any of the aforementioned objects or locations, then the process 800 moves to step 870 where the main video, the first PIP, the second PIP, the third PIP and the fourth PIP are recorded. In some embodiments, the video is the main video on the display over which the first and second PIPs are situated. In some embodiments, the video, the first PIP, the second PIP, the third PIP and the fourth PIP are all recorded in the same display. For example, the recording may be of the main video with the four PIPs situated over the main video. In some embodiments, the video, the first PIP, the second PIP, the third PIP and the fourth PIP are all recorded in different displays or otherwise in different files. For example, the main video may be recorded on one display or file, the first PIP recorded in a first display or file, the second PIP recorded in a second display or file, etc.

In some embodiments, portions of process 800 are performed. For example, process 800 may be performed with only two or three PIPs. In some embodiments, process 800 is performed in different orders. For example, the first PIP may be located first, and the third PIP may be located second. Other variations such as these to the process 800 are within the scope of the present disclosure.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of a display or pixels may refer to a sub-collection of that display or those pixels.

The various illustrative logical blocks, modules, and circuits described in connection with the implementations disclosed herein may further be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for displaying a plurality of pictures in a picture (PIP) on an electronic device, the method comprising:
   capturing a first field of view in a first direction with a first imaging sensor of the device;
   capturing a second field of view in a second direction with a second imaging sensor of the device, wherein the second direction is different from the first direction;
   displaying a video of the first field of view on a screen of the device;
   selecting a first object in the video;
   recognizing selection of the first object;
   defining a region of interest (ROI) in the video that includes the first object, wherein the ROI moves with the first object as the first object moves in the video;
   displaying a first PIP on the screen that is separate from the ROI in the video, wherein the first PIP is displayed in a position having a first location on the screen such that the first PIP in the first location does not interfere with the ROI in the video, wherein the first PIP continuously displays a first PIP video that includes an image of the first object;
   tracking the first object and displaying the first object in the first PIP as the first object is being tracked;
   displaying a second PIP on the screen, wherein the second PIP displays a second PIP video that includes an image of a second object from the second field of view; and
   moving the first PIP and the second PIP together as a group in response to determining that the first PIP or the second PIP interferes with the defined ROI.

2. The method of claim 1, further comprising detecting the first object when the first object is displayed on the screen.

3. The method of claim 1, further comprising recording the video, the first PIP video and the second PIP video.

4. The method of claim 1, further comprising:
   displaying a third PIP and a fourth PIP on the screen, wherein the third PIP displays a third object and the fourth PIP displays a fourth object; and
   tracking the first, second, third and fourth objects as they are being displayed.

5. The method of claim 1, further comprising displaying the defined ROI on the screen.

6. The method of claim 1, wherein defining the ROI comprises defining a margin that leaves a specified amount of distance between a boundary of the first object and the ROI.

7. A system for displaying a plurality of pictures in a picture (PIP) on an electronic device, the system comprising:
   at least one imaging sensor configured to capture a first field of view in a first direction and a second field of view in a second direction, wherein the second direction is different from the first direction;
   a processor configured to:
      recognize selection of a first object to track in a video of the first field of view;
      define a region of interest (ROI) in the video that includes the first object, wherein the ROI moves with the first object as the first object moves in the video;
      detect and track the first object in the video;
      generate a first PIP that is separate from the ROI in the video and comprising the first object in a first PIP video as the first object is being tracked;
      determine a position for the first PIP having a first location such that the first PIP in the first location does not interfere with the ROI in the video; and
   a screen configured to display the video, the first PIP comprising the first object as it is being tracked, and a second PIP comprising a second PIP video that includes a second object from the second field of view, wherein the first PIP is displayed in the position having the first location, wherein the processor is further configured to move the first PIP and the second PIP together as a group in response to determining that the first PIP or the second PIP interferes with the defined ROI.

8. The system of claim 7, wherein the processor is further configured to record the video, the first PIP video and the second PIP video.

9. The system of claim 8, wherein the processor is further configured to record the video, the first PIP video and the second PIP video each as separate videos.

10. The system of claim 8, wherein the processor is further configured to generate a third PIP and a fourth PIP, and the screen is further configured to display the third PIP and the fourth PIP.

11. The system of claim 7, wherein the processor is further configured to track the second object and the screen is further configured to display the tracked second object in the second PIP video.

12. The system of claim 7, wherein the first PIP is resizable.

13. The system of claim 7, wherein the video is a live video.

14. The system of claim 7, wherein the video is a recorded video.

15. The system of claim 7, wherein the processor is further configured to display the defined ROI on the screen.

16. The system of claim 7, wherein the processor is further configured to define the ROI by defining a margin that leaves a specified amount of distance between a boundary of the first object and the ROI.

17. A system for displaying a plurality of pictures in a picture (PIP) on an electronic device, the system comprising:

means for capturing a first field of view in a first direction;
means for capturing a second field of view in a second direction, wherein the second direction is different from the first direction
means for displaying a video of the first field of view on a screen of the device;
means for selecting a first object in the video;
means for recognizing selection of the first object;
means for defining a region of interest (ROI) in the video that includes the first object, wherein the ROI moves with the first object as the first object moves in the video;
means for displaying a first PIP on the screen that is separate from the ROI in the video, wherein the first PIP is displayed in a position having a first location on the screen such that the first PIP in the first location does not interfere with the ROI in the video, wherein the first PIP continuously displays a first PIP video that includes an image of the first object;
means for tracking the first object and displaying the first object in the first PIP as the first object is being tracked;
means for displaying a second PIP on the screen, wherein the second PIP displays a second PIP video that includes an image of a second object from the second field of view; and
means for moving the first PIP and the second PIP together as a group in response to determining that the first PIP or the second PIP interferes with the defined ROI.

18. The system of claim 17, further comprising means for recording the video, the first PIP video and the second PIP video.

19. The system of claim 17, further comprising means for displaying the defined ROI on the screen.

20. The system of claim 17, wherein the means for defining the ROI comprises means for defining a margin that leaves a specified amount of distance between a boundary of the first object and the ROI.

21. A non-transient computer readable medium configured to store instructions that when executed by a processor perform a method for displaying a plurality of pictures in a picture (PIP) orientation on an electronic device, the method comprising:

capturing a first field of view in a first direction with a first imaging sensor of the device;
capturing a second field of view in a second direction with a second imaging sensor of the device, wherein the second direction is different from the first direction;
displaying a video of the first field of view on a screen of the device;
selecting a first object in the video;
recognizing selection of the first object;
defining a region of interest (ROI) in the video that includes the first object, wherein the ROI moves with the first object as the first object moves in the video;
displaying a first PIP on the screen that is separate from the ROI in the video, wherein the first PIP is displayed in a position having a first location on the screen such that the first PIP in the first location does not interfere with the ROI in the video, wherein the first PIP continuously displays a first PIP video that includes an image of the first object;
tracking the first object and displaying the first object in the first PIP as the first object is being tracked;
displaying a second PIP on the screen, wherein the second PIP displays a second PIP video that includes an image of a second object from the second field of view;
moving the first PIP and the second PIP together as a group in response to determining that the first PIP or the second PIP interferes with the defined ROI.

22. The computer readable medium of claim 21, the method further comprising recording the video, the first PIP video and the second PIP video.

23. The computer readable medium of claim 21, wherein the method further comprises displaying the defined ROI on the screen.

24. The computer readable medium of claim 21, wherein defining the ROI comprises defining a margin that leaves a specified amount of distance between a boundary of the first object and the ROI.

* * * * *